UNITED STATES PATENT OFFICE.

BARTHOLOMEW A. JEAGER, OF BOWER'S STATION, PENNSYLVANIA.

IMPROVED COMPOUND FOR PRESERVING WOOD.

Specification forming part of Letters Patent No. 81,172, dated August 18, 1868.

*To all whom it may concern:*

Be it known that I, BARTHOLOMEW A. JEAGER, of Bower's Station, in the county of Berks and State of Pennsylvania, have invented a new and useful Composition for Preserving Wood; and I do hereby declare that the following is a full, clear, and exact description thereof, which will enable those skilled in the art to make and use the same.

The object of this invention is to produce a substance by which wood can be preserved from decomposition, and by which its pores will be filled, to prevent them from receiving moisture and oxygen.

The composition which I have found to answer the aforementioned objects consists of oxide of zinc and sulphate of copper.

These ingredients are mixed in a powdered state, in suitable proportions, which will vary with the quality of wood to be impregnated.

The substance is, by suitable mechanism, agent, or vehicle, forced or carried into the pores of the wood. It will combine with the albumen of the wood to form a hard, petrified core, which will exclude moisture and oxygen, and will surround the fibers of the wood, and protect them from the injurious effects of moisture and oxygen.

Having thus described my invention, what I claim as new, and desire to secure by Letters Patent, is—

A composition for preserving wood, consisting of the ingredients herein set forth.

The above specification of my invention signed by me this 22d day of June, 1868.

BARTHOLOMEW A. JEAGER.

Witnesses:
A. V. HOTTENSTEIN,
H. H. SCHWARTZ.